United States Patent
Sova et al.

Patent Number: 5,709,498
Date of Patent: Jan. 20, 1998

[54] SWIVEL CLIP FOR LINKAGE ROD

[75] Inventors: Edward J. Sova, Troy; Richard Wong, Fraser; Nicolaas C. Akemann, South Lyon,; Leonard L. Wu, Brighton; Earl L. Watson, Walled Lake, all of Mich.; Andrew J. Palmisano, Hinsdale, Ill.

[73] Assignee: Chrysler Corporation, Auburn Hills, Mich.

[21] Appl. No.: 767,459

[22] Filed: Dec. 16, 1996

[51] Int. Cl.$^6$ ..................................................... F16B 9/00
[52] U.S. Cl. .......................... 403/196; 403/163; 74/502.4; 74/502.6
[58] Field of Search .................................. 403/196, 197, 403/194, 161–163; 74/502.4, 502.6, 579 R; 384/428

[56] References Cited

U.S. PATENT DOCUMENTS

| | | | |
|---|---|---|---|
| 2,578,639 | 12/1951 | Bedford, Jr. | 403/162 |
| 3,231,300 | 1/1966 | Moroney | 403/163 |
| 3,233,930 | 2/1966 | Becker | 403/163 |
| 3,236,549 | 2/1966 | Phinney | 403/162 |
| 3,253,480 | 5/1966 | Fernberg | 384/428 X |
| 3,914,061 | 10/1975 | Meyer | 403/197 |
| 4,675,937 | 6/1987 | Mitomi | 403/194 X |

*Primary Examiner*—Thomas R. Hannon
*Attorney, Agent, or Firm*—Lawrence J. Shurupoff

[57] ABSTRACT

A linkage comprising an elongated rod, a rod actuator to longitudinally reciprocate the rod, and a clip of flexible, resilient material connecting the rod to the actuator. The clip has a circular hub rotatably received in an opening in the actuator. The rod has a hook at one end received in a hole in the hub of the clip. The hole is elongated to enable the rod to be axially rotated to facilitate the insertion of the hook end in the hole during assembly. The clip has a stabilizing arm extending laterally from the hub. The rod is received in a transverse slot in the arm.

9 Claims, 2 Drawing Sheets

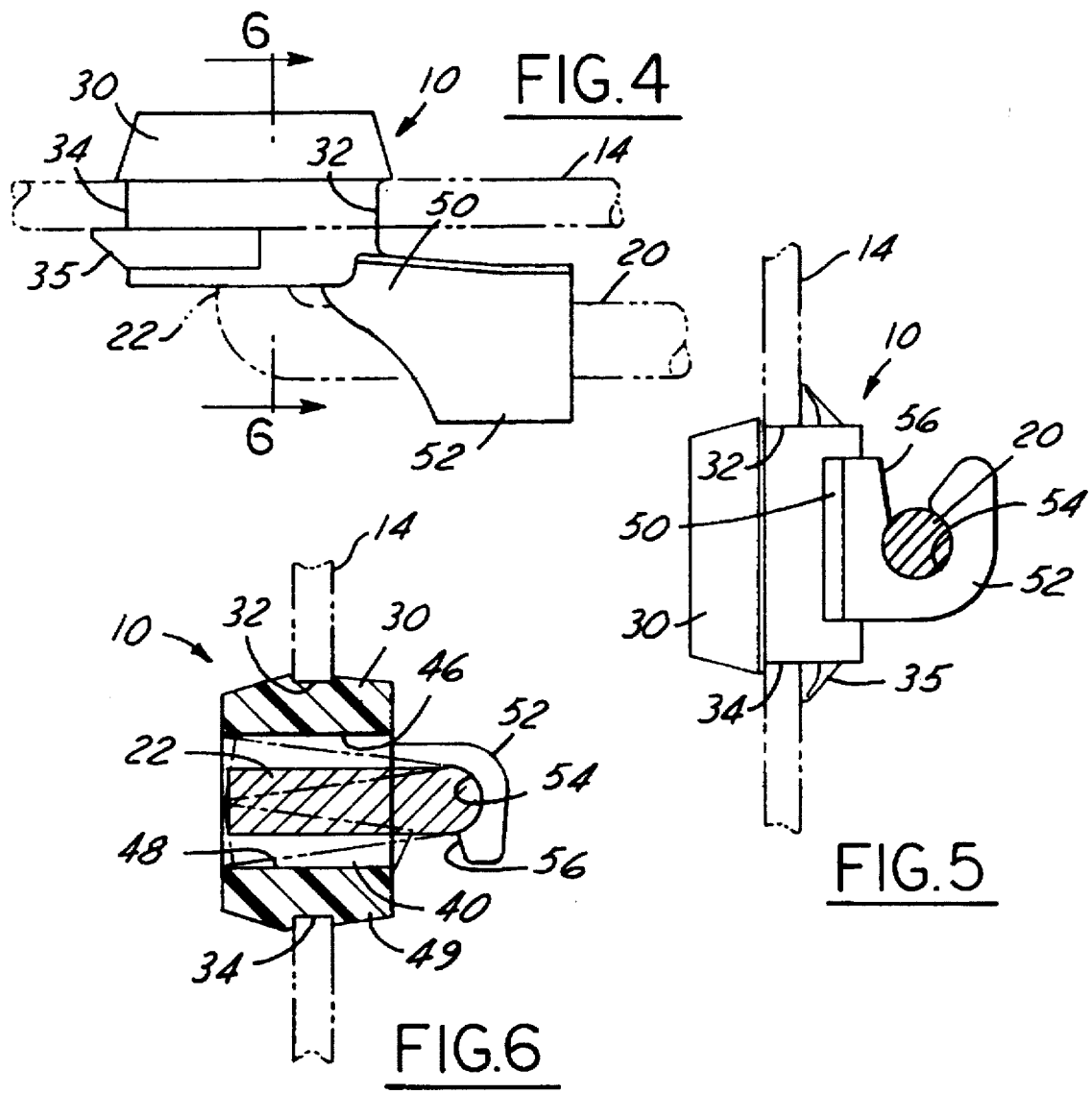

SWIVEL CLIP FOR LINKAGE ROD

FIELD OF INVENTION

This invention relates generally to clips and more particularly to a swivel clip for connecting an actuator to a linkage rod.

BACKGROUND AND SUMMARY

Clips employed to connect a linkage or control rod to an actuator are sometimes difficult to install. When installation is made on an automobile assembly line, for example, the entire line may be slowed down.

In accordance with the present invention, the clip is designed so that it may be installed or assembled with the control rod quickly and easily. The control rod may, for example, extend between a door handle and a door latch of an automotive vehicle. The clip has a circular hub which fits in a circular opening in an arm on the door handle so that it is free to rotate or swivel. The rod has a right angle bend at one end which is adapted to fit in a center hole in the clip hub. If this center hole is round, just large enough to fit the rod end, an assembly line person will have difficulty fitting it into the hole. Sometimes it is necessary to rotate the rod slightly and this adds to the difficulty. To facilitate assembly, the hole is elongated so that it has an oval shape, permitting the rod end to be rotated slightly and therefore more easily fitted in the hole.

The clip preferably has an arm which is perpendicular to the elongated hole in the hub and snaps onto the rod to keep the rod from coming out of the clip.

One object of this invention is to provide a clip for use in attaching one end of a control rod to an actuator which has the foregoing features and capabilities.

Another object is to provide a clip which is of simple one-piece construction, is rugged and durable in use, and is capable of being readily manufactured and installed between a control rod and an actuator.

These and other objects, features and advantages of the invention will become more apparent as the following description proceeds, especially when considered with the accompanying drawings and claims.

BRIEF DESCRIPTION OF THE DRAWINGS

FIG. 4 is a view of the clip looking in the direction of the arrow 4 in FIG. 3.

FIG. 5 is a view of the clip looking in the direction of the arrow 5 in FIG. 1.

FIG. 6 is a sectional view taken on the line 6—6 in FIG. 4.

DETAILED DESCRIPTION

Figure 1:
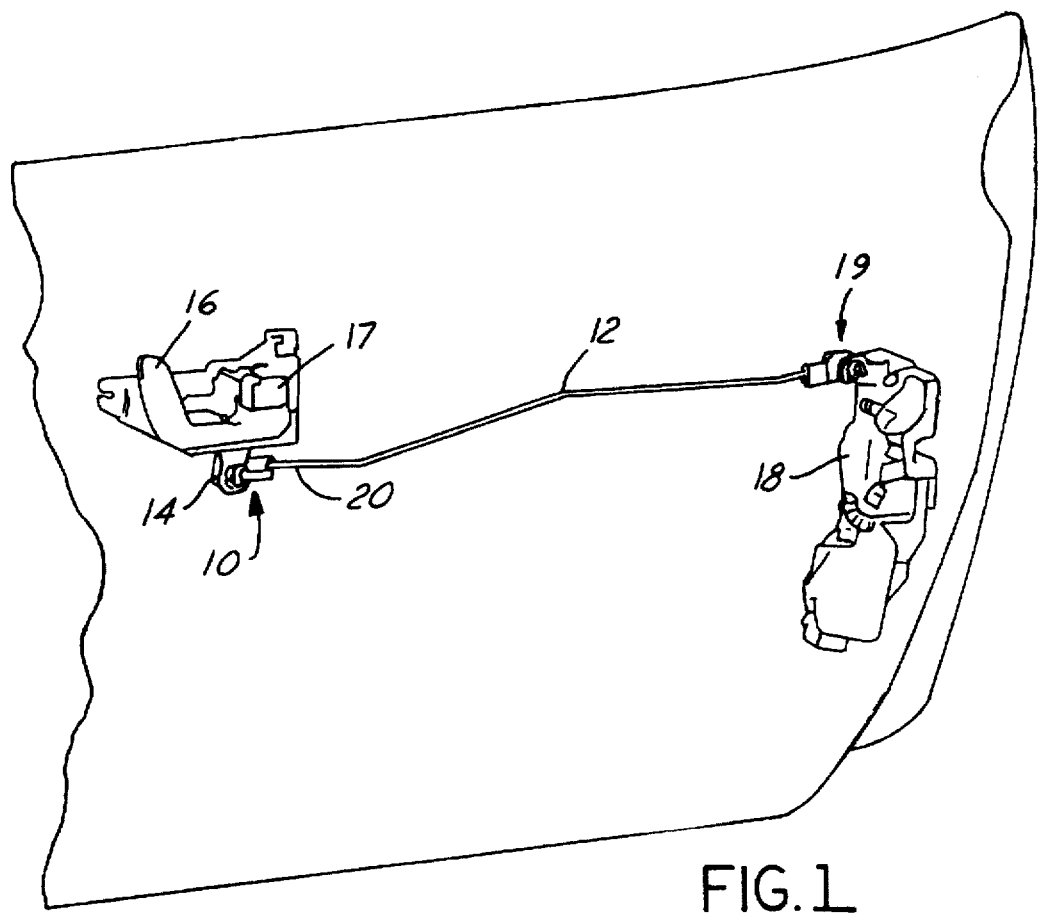
FIG. 1 is a perspective view showing a linkage or control rod extending between a vehicle door handle and a door latch, including a clip at each end of the rod, constructed in accordance with the invention.
Figure 2:
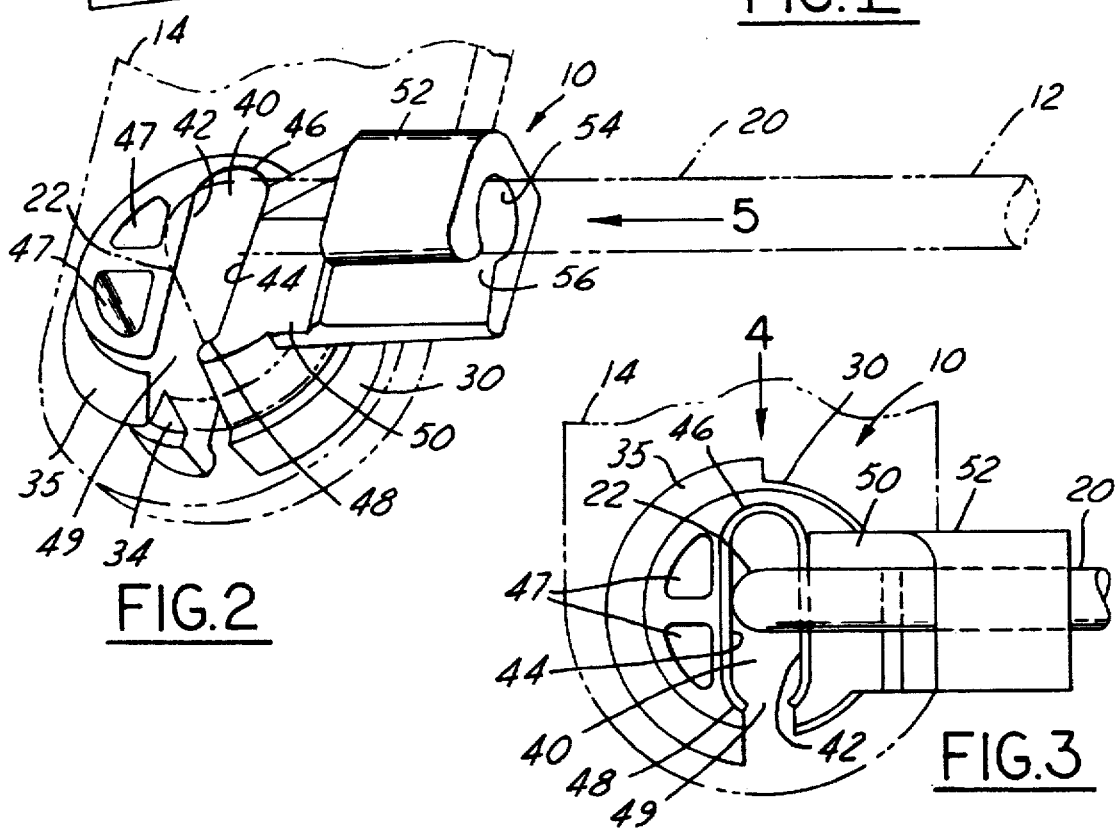
FIG. 2 is a perspective view of the clip.
Figure 3:
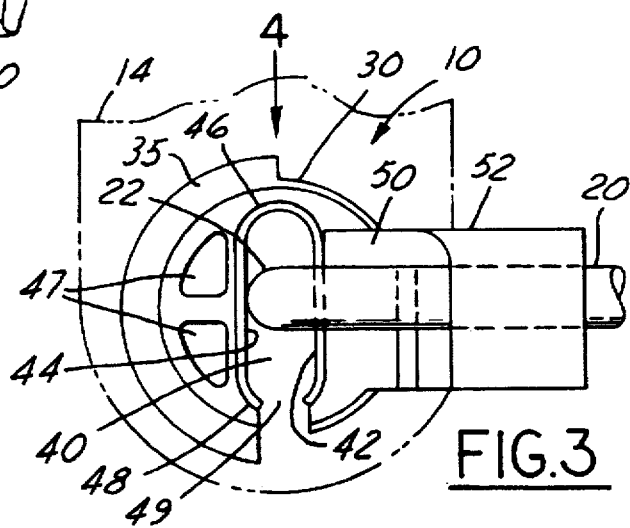
FIG. 3 is an elevational view of the clip.

Referring now more particularly to the drawings, a swivel clip 10 of integral, one-piece construction is shown connecting one end of an elongated linkage or control rod 12 to an actuator 14. In this instance, the actuator 14 is an arm in the form of a flat plate connected to a handle 16 of a car door, for example. The handle is mounted on a fixed pivot 17 for rotation. The opposite end of the rod 12 may be connected to a door latch assembly 18 by a second clip 19 identical to clip 10.

The rod has a main body portion 20 of uniform circular cross section formed with a bend at one end providing a hook 22 extending perpendicular to the main body portion.

The clip 10 is preferably formed of a flexible resilient material such as nylon or an acetal resin. The clip has a circular hub 30 which is received in a circular opening 32 in the actuator 14 and is capable of rotating in the opening. The hub has a circumferentially extending groove 34 in which the actuator is releasably retained. One side of the groove is continuous, except for a split in the hub, more fully described below. The other side extends only about half way around the hub and is defined by a radial flange 35. The flange 35 is thin and flexible. Its purpose is to place clip 10 in tension so that it won't rattle against the actuator 14.

The hub 30 is formed with a central hole 40. The hole 40 is somewhat oval shaped or elongated, having parallel sides 42 and 44 and arcuate ends 46 and 48. The hub 30 is split at one end of the hole where indicated at 49. The split in the hub enhances flexibility, enabling it to be more readily inserted into the opening 32 in the actuator. The cored out portions 47 of the hub further enhance flexibility and also make the clip lighter and requires less material.

The clip has an elongated arm 50 integral with the hub and extending perpendicular to the lengthwise dimension of the hole 40. The arm 50 has an enlargement 52 at its free end formed with a slot 54 perpendicular to the lengthwise dimension of the hole 40 to receive the main body portion 20 of the rod at a point spaced from the hook end 22. The slot 54 is of arcuate cross section and greater than 180° in circumferential extent to closely receive the rod. A side opening 56 leading to the slot enables the rod to be laterally pressed into the slot with a snap action.

The elongation of the hole 40 is primarily to facilitate installation and assembly. The elongation of the hole permits the rod to be rotated slightly about its longitudinal axis, thus making it easier to install the hook end 22 into the hole. After assembly of the hook end in the hole, the clip functions in the same manner as it would function if the hole were round and closely received the rod end, rather than elongated. In use, the clip 10 connects the actuator 14 to the rod 12, so that the actuator can longitudinally reciprocate the rod.

The hole 40 in the hub of the clip has a width dimension which is substantially the same as the diameter of the rod end and a substantially longer length dimension to enable the rotation of the rod for assembly purposes.

We claim:

1. A linkage comprising an elongated rod, a rod actuator to longitudinally reciprocate said rod, and a clip of flexible, resilient material connecting said rod to said actuator, said actuator having a circular opening, said clip having a circular hub rotatably received in said opening, said rod having a main body portion terminating in a hook end extending perpendicular to said main body portion, the hub of said clip having a hole receiving said hook end, said hole being elongated transversely of the main body portion of said rod to enable said rod to be axially rotated to facilitate the insertion of the hook end in said hole during assembly.

2. A linkage as defined in claim 1, wherein said hole has a width dimension and a length dimension, and said rod has a circular cross section of a diameter substantially equal to said width dimension.

3. A linkage as defined in claim 1, wherein said hub has a wall surrounding said hole, said wall being transversely split to enhance flexibility.

4. A linkage as defined in claim 1, wherein said clip has a stabilizing arm integral with said hub extending laterally therefrom, and a transverse slot in said arm receiving said main body portion of said rod at a point spaced from said hook end.

5. A linkage as defined in claim 1, wherein said hub has a circumferentially extending groove, and the circular opening in said actuator is received in said groove.

6. A linkage as defined in claim 5, wherein said hole has parallel sides and curved ends and has a width dimension and a length dimension, and said rod has a circular cross section of a diameter substantially equal to said width dimension.

7. A linkage as defined in claim 6, wherein said hub has a wall surrounding said hole, said wall being transversely split at one end of said hole to enhance flexibility.

8. A linkage as defined in claim 7, wherein said clip has a stabilizing arm integral with said hub extending laterally from said hub and perpendicular to the length dimension of said hole, and a transverse slot in said arm receiving said main body portion of said rod at a point spaced from said hook end.

9. A linkage as defined in claim 8, wherein said transverse slot is of arcuate cross-section and greater than 180° in circumferential extent to closely receive said rod, and a side opening leading to said slot to enable the rod to be laterally pressed into said slot with a snap action.

\* \* \* \* \*